UNITED STATES PATENT OFFICE.

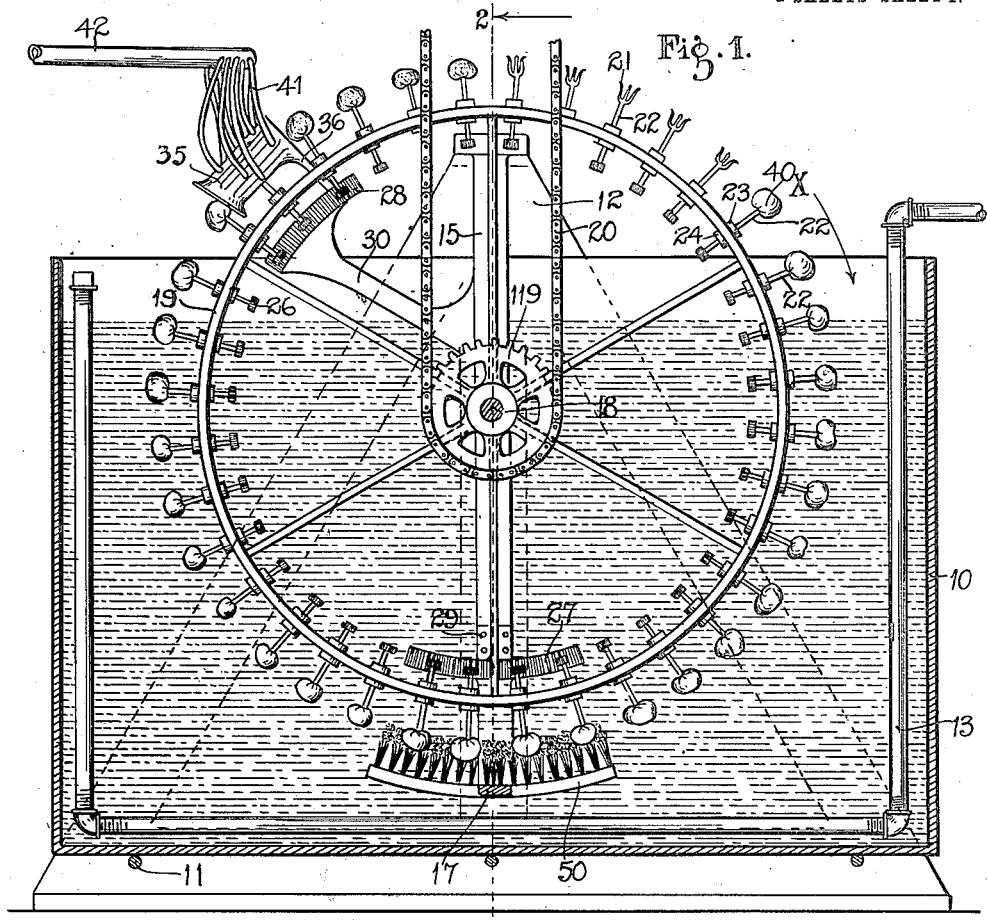

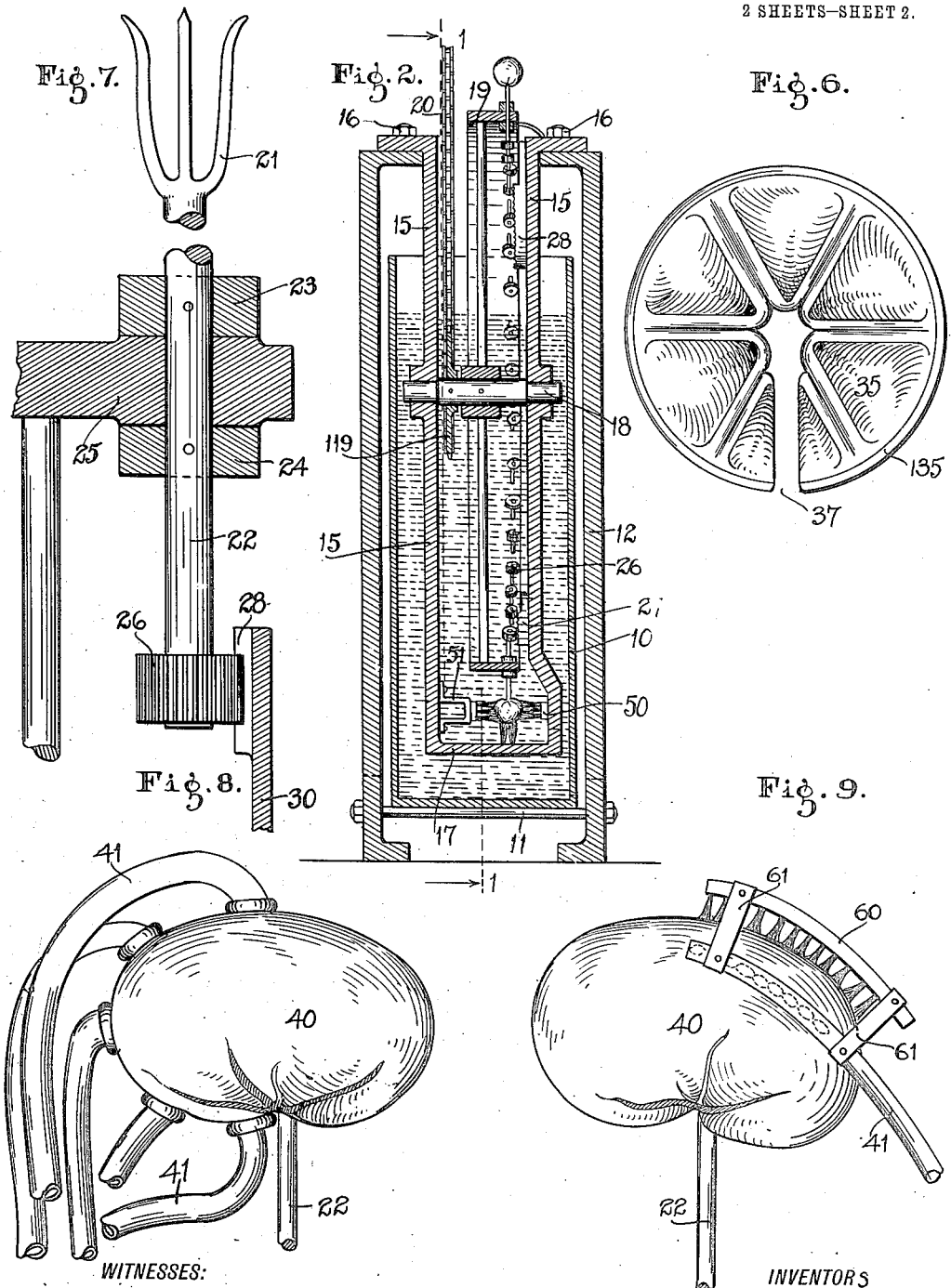

CHARLES G. CHASE AND HARRY C. BUSCHMANN, OF INDIANAPOLIS, INDIANA.

VEGETABLE AND FRUIT PEELING MACHINE.

1,122,859.

Specification of Letters Patent.

Patented Dec. 29, 1914.

Application filed January 21, 1913. Serial No. 743,243.

*To all whom it may concern:*

Be it known that we, CHARLES G. CHASE and HARRY C. BUSCHMANN, citizens of the United States, and residents of Indianapolis, county of Marion, and State of Indiana, have invented a certain new and useful Vegetable and Fruit Peeling Machine; and we do hereby declare that the following is a full, clear, and exact description thereof, reference being had to the accompanying drawings, in which like letters refer to like parts.

The object of this invention is to provide an apparatus for peeling fruit, vegetables and the like, particularly tomatoes, beets, sweet potatoes and peaches, rapidly, economically and otherwise satisfactorily.

The chief feature of the invention consists in removing the skins from fruits and vegetables in which the power employed is the pressure of the atmosphere produced by creating a vacuum, and the removal of skins by passing them through a vacuum tube and thus providing a means for taking care of the waste material.

In carrying out this feature of the invention, a vacuum tube is provided, with an open end to the mouth of which is placed the fruit or vegetable to be peeled. A suction head, is also provided, through which is fed fruits and vegetables, and to which may be attached one or more vacuum tubes, which number of tubes depends solely upon the kind or variety of fruit or vegetable being peeled.

The nature of the invention will be understood from the accompanying drawings and the following description and claims.

In the drawings, Figure 1 is a vertical section, substantially on the line 1—1 of Fig. 2. Fig. 2 is a transverse central vertical section on the line 2—2 of Fig. 1. Fig. 3 is a side elevation on an enlarged scale of the suction head with the suction tubes partially broken away. Fig. 4 is a transverse section thereof on the line 4—4 of Fig. 3 showing the same in collapsed condition. Fig. 5 is the same as Fig. 4, showing it expanded with a tomato passing through it. Fig. 6 is an elevation of the left-hand end of the suction head, as shown in Fig. 3, in collapsed condition. Fig. 7 is a section radially and transversely through the rim of the wheel showing one of the forks, and parts being broken away. Fig. 8 is an elevation of a modified arrangement of suction tubes as applied to a tomato. Fig. 9 is another modified construction of the peel removing means.

As seen in Fig. 1, there is a tank 10 which is almost filled with water. As shown in Fig. 2, this tank is supported on the cross rods 11 extending between vertical side frames 12. The side frames are triangular, as indicated in Fig. 1, and are skeleton frames with a central vertically extending bar. The upper ends of these side frames are turned inwardly horizontally some distance, but spaced apart so as to leave a wide opening between them above the tank. The water in the tank is heated with a steam pipe 13.

Within the tank an inner frame is suspended from the tops of the sides of the outer frames 12. The inner frame consists of two side bars 15 with outwardly extending flanges at the top resting upon the inwardly extending flanges from the outer frames 12 and secured by bolts 16. These frame bars 15 extend almost to the bottom of the tank 10 and are held in operative positions by a cross bar 17 at the lower end. The inner frame bars 15 have bearings about midway their length for the spindle 18 of a wheel 19, so that by far the greater portion of said wheel extends down into the tank, although the upper portion thereof projects above the tank. The wheel consists of a rim, spokes and hub, and on the hub there is a sprocket wheel 119 which is driven by a chain 20 from some source of power, whereby the wheel is revolved in the direction indicated by the arrow in Fig. 1.

As seen in Fig. 2, the rim of the wheel 19 extends farther beyond the spokes at one side than at the other, and on said extended side of the rim there is an annular series of forks mounted. These forks consist of the outer fork portion 21 and a shaft or shank portion 22 which extends radially through the rim of the wheel 19 and is rotatably mounted. For this purpose there are collars 23 and 24 secured to the fork shaft 22, one on the outside and one on the inside of the rim of the wheel to hold the fork from longitudinal displacement and, therefore, the rim of the wheel is preferably provided with flattened lugs 25 for the collars 23 and 24 to bear upon.

The shafts or shanks 22 of the forks extend only a short distance inward beyond the rim and carry on their inner ends beveled pinions 26 adapted, during the revolution of the wheel, to come into mesh with segmental rack bars 27 and 28. The rack bar 27 is secured by a bracket 29 to one of the inner frame bars 15 near its lower end so as to be wholly submerged in the water. The rack bar 28 is mounted on an arm 30 projecting from the upper part of an inner frame bar 15, as shown in Fig. 1. It extends from the frame bar 15 near the middle and extends upwardly at an inclination to a point just above the tank 10 so that it is never submerged.

Radially opposite the rack bar 28 a suction head 35 is mounted on an arm 36 extending from the arm 30. This suction head, as shown in Figs. 3 and 6, is substantially cylindrical and expands longitudinally parallel with the rim of the wheel and is radially slotted at 37, see Fig. 6, to permit the shank of the fork to pass through it as the wheel 19 is revolved and carry a tomato 40 through the suction head. The front end of the suction head is circular and is maintained in expanded position by a ring 135. The remainder of the suction head is formed of resilient flexible material which is folded normally as indicated in Figs. 4 and 6. There are six folds shown. The fold on the resilient portion of the suction head expands to accommodate the tomato which is carried through it, according to the size of the tomato. As seen in Fig. 5, a medium sized tomato 40 is passing through the suction head and it has expanded only some of the folds. A larger tomato would expand more of the folds. Therefore, the surface or peeling of the tomato rubs against the inner wall of the suction head, as seen in Fig. 5, as the tomato is carried through by the fork and is rubbed off in particles and thus those particles are drawn out and removed by suction tubes 41 which extend from various portions of the suction head and merge into one common suction tube 42 extending to some air exhausting means and having some discharge outlet, which are not shown.

In operation a person standing at the right-hand side of the device, as shown in Fig. 1, places a tomato upon each fork 21 as it comes into convenient position, say at the point where it is marked "X". The stem portion of the tomato is inserted on the fork so that the remaining or smooth portion of the tomato will be presented to the apparatus and suction head. The wheel revolves continuously and carries the tomatoes on the forks down into the hot water in the tank. In the lower part of the tank, the tomatoes come in contact with cleaning brushes 50. There are three of these, as seen in Fig. 2, one mounted on the lower end of each frame bar 15 and one on the cross bar 17. A bracket 51 is secured to one frame bar for mounting one of the brushes so as to bring the brush in the right position. These brushes engage the surface of the tomato. When the tomatoes reach the brushes 50, the rack 27 revolves the forks and tomatoes so as to promote the cleaning of them.

The movement of the tomatoes through the water scalds them so as to render the peeling readily removable and then the tomatoes are moved successively through the head 35 where the peeling is removed.

The modified form of suction apparatus, shown in Fig. 8, omits the suction head, but provides a number of suction tubes 41 with their suction ends positioned to come in touch with the surface of the tomato and the revolution of the tomato will cause all parts of the surface to come within the suction influences of the tubes. The tubes 41 may be held by hand or by any suitable means, not shown.

The modified form shown in Fig. 9, is also held by hand and consists of a tube 41 with a plurality of suction holes and a brush 60 located in advance of the suction tube so that it will dislodge the peeling as the tomato revolves and the scraps of peeling will be taken up by the suction tube. The brush and tube are held together by the connections 61.

Any suitable means may be used for lowering the atmospheric pressure to a vacuum within the tubes and head, which may be accomplished by the use of a vacuum pump or any other convenient means that the user may care to adopt. The tubes and head may be made of either metal or flexible materials. The suction head, as shown in Fig. 3, is particularly adapted for peeling tomatoes and peaches. It is cylindrical in form, the mouth of which is circular and is maintained in an expanded position by a ring; its walls are made of resilient and flexible materials, having bellows or bag folds, made of similar materials, running longitudinally, and having expansionable cross sections at each end used as doors for opening and closing the head to admit and discharge the fruit. After the fruits or vegetables are scalded, which may be accomplished by any of the different and well known methods, they are fed by hand, or by any suitable mechanism that will not break the skins, into the mouth of the suction head. When the fruit enters the mouth of the head, the vacuum within causes the atmospheric pressure without to shut the cross sections air tight behind the fruit, and the air, admitted along with the fruit, is immediately pumped out and a vacuum created within the head. Pumping the air out of the head draws the fruit against the tubes and holds it there by a stronger vacuum being created in the tubes than in the head. The vacuum within the head is sufficient for the fruit to be extracted from its skin without resistance, and the removal of the fruit may be accomplished either by hand, gravity, or by any suitable mechanism, best adapted for conveying the particular variety of fruits or vegetables through the suction head. Just as the peeled fruit leaves the rear end of the suction head, it opens the cross sections and air rushes into the suction head, breaking through the walls of skin that are stretched across the mouth of the tubes, and thereby creating a suction that draws the skin out of the suction head into and through the tubes and discharging it through a tube or pipe into any suitable receptacle.

The number of tubes that will be engaged in peeling fruits and vegetables will depend upon the particular variety peeled, as some fruits and vegetables are more perfectly peeled by the use of only one tube, while other varieties require a sufficient number of tubes to cover their entire surface.

We claim as our invention:

1. A vegetable and fruit peeler including a suction head and means for holding the vegetable or fruit and moving it through said suction head, whereby the pressure of the atmosphere produced by the vacuum will remove the peeling and convey it away.

2. A vegetable and fruit peeler including a suction head and means for holding the vegetable or fruit and moving it through said suction head, and one or more vacuum tubes connected with said suction head, whereby the pressure of the atmosphere produced by the vacuum in said head will remove the peeling and convey it away.

3. A vegetable and fruit peeler including a suction head and means for holding the vegetable or fruit and moving it through said suction head, and one or more vacuum tubes connected with said suction head, whereby the pressure of the atmosphere produced by the vacuum in said head will remove the peeling and convey it away.

4. Suction means for removing peeling from vegetables and fruits which includes a suction head and means for holding the vegetable or fruit and moving it through said suction head, said suction head being normally collapsed but capable of being expanded to permit the passage of vegetables or fruits of various sizes, and one or more vacuum tubes leading from said suction head through which the skin is conveyed and discharged to some suitable place.

5. Means for removing the peeling from vegetables and fruits which includes a suction head having a constantly expanded entrance end and a normally collapsed flexible body portion and means for holding the vegetable or fruit and moving it through said suction head and one or more vacuum tubes leading from the body portion of the suction head to a main pipe through which the skin is conveyed into a receptacle.

6. Suction means for removing the peeling from vegetables and fruits which includes a suction head and means for holding the vegetable or fruit and moving it through said suction head, and one or more vacuum tubes leading from the wall of the suction head.

7. Suction means for removing peeling from vegetables and fruits which includes a suction head having a constantly expanded entrance end and a normally collapsed flexible body portion and means for holding the vegetable or fruit and moving it through said suction head, and a plurality of vacuum tubes leading from the body portion of the suction head.

8. Means for removing the peeling from vegetables and fruits which includes a suction head having a constantly expanded entrance end and a normally collapsed flexible body portion and means for holding the vegetable or fruit and moving it through said suction head, and a plurality of vacuum tubes leading from the body portion of the suction head.

In witness whereof, we have hereunto affixed our signatures in the presence of the witnesses herein named.

CHARLES G. CHASE.
HARRY C. BUSCHMANN.

Witnesses:
  ORPHA M. McLAUGHLIN,
  GERTRUDE H. BOINK.